July 6, 1926.
D. D. TRACY
1,591,248
APPARATUS FOR LAYING CONDUIT SECTIONS
Filed Dec. 8, 1925
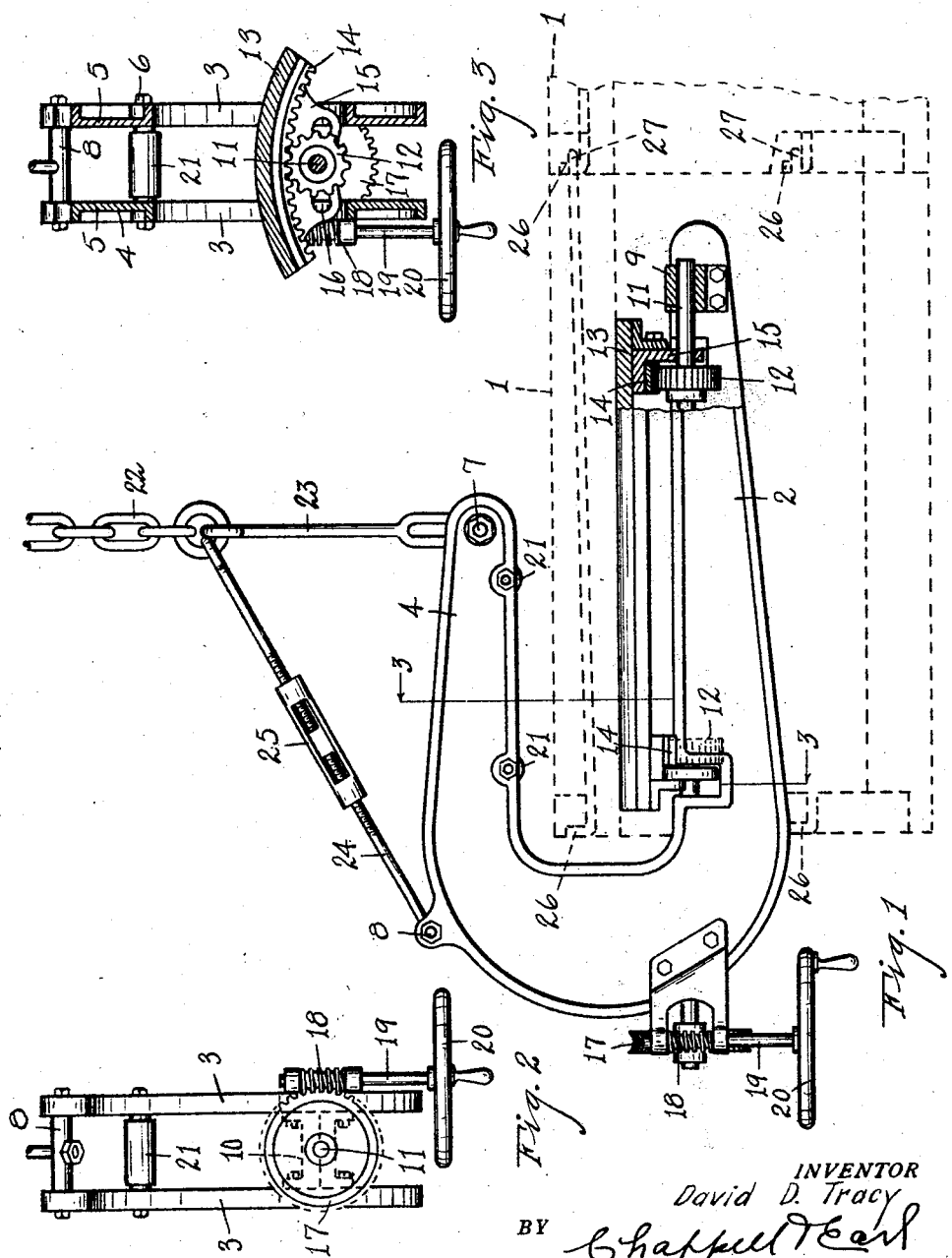
INVENTOR
David D. Tracy
BY
ATTORNEYS Patented July 6, 1926.

1,591,248

UNITED STATES PATENT OFFICE.

DAVID D. TRACY, OF JACKSON, MICHIGAN.

APPARATUS FOR LAYING CONDUIT SECTIONS.

Application filed December 8, 1925. Serial No. 74,139.

My improved apparatus for laying conduits is especially designed by me for the laying of sectional conduits of the type shown in my application for Letters Patent filed November 18, 1925, Serial No. 69,887 and I have illustrated my improvements as embodied and adapted for that purpose. My improvements are, however, readily adapted and desirable for use in laying and handling conduits generally.

The main objects of this invention are:

First, to provide an apparatus for laying conduits in which conduits of large diameters, the sections of which are of considerable weight, may be laid with a minimum amount of manual labor or effort, the sections being easily aligned and brought into abutting relation.

Second, to provide an improved apparatus for the laying of conduit sections which minimizes breakage.

Objects relating to details and economies of construction and operation of my invention will definitely appear from the detailed description to follow.

The invention is clearly defined and pointed out in the claims.

A structure which is a preferred embodiment of my invention is illustrated in the accompanying drawing, forming a part of this application, in which:

Fig. 1 is a side elevation of an apparatus embodying the features of my invention, the parts being sectional and broken away for convenience in illustration, sections of conduit being illustrated by dotted lines.

Fig. 2 is an end elevation looking from the left of Fig. 1.

Fig. 3 is a vertical section on a line corresponding to line 3—3 of Fig. 1.

In the drawing similar reference characters refer to similar parts throughout the several views.

Referring to the drawing, 1, 1 represents conduit sections such as are illustrated in my said application for Letters Patent filed November 18, 1925, Serial No. 69,887.

My improved conduit laying apparatus comprises a supporting bar 2 preferably formed of a pair of spaced members 3 having an integral overhanging suspending arm 4, the arm being also formed of spaced members 5, the members forming the bar and the suspending arm being integral. These parts are connected by the bolts 6 through the spacers 7 and 8. The bearing members 9 and 10 for the shaft 11 constitute spacing and connecting members for the parts 2.

The shaft 11 is provided with gears 12 which support the segmental saddle 13, this saddle having racks 14 resting on the gears, the racks having depending brackets 15 longitudinally slotted at 16 to receive the shaft.

The shaft has a worm gear 17 at its outer end engaged by the worm 18 on the shaft 19 having a hand wheel 20. This provides means by which the saddle, even when supporting a heavy conduit section, may be easily rocked laterally and the worm provides a locking means for holding the parts in position.

Rollers 21 are arranged on the underside of the suspending arm, the rollers being adapted to travel on top of the conduit section when the suspending bar is introduced therein.

The suspending chain 22 is connected by the link 23 to the outer end of the suspending arm, a link 24 having a turnbuckle 25 extending from the base of the arm to the chain so that the supporting bar is held in a horizontal position.

The conduit sections illustrated are provided with upwardly facing hooks 26 and the abutting end of the adjacent section has eyes 27 adapted to coact with these hooks so that the parts engage when the conduit sections are in abutting relation.

By means of my improved apparatus the sections may be brought into abutting relation and shifted by adjusting the supporting saddle to bring the engaging parts into aligned relation and this is desirable also where coupling means are not provided but it is desired to register joint grooves or the like, the device being raised or lowered by means of a cable when in proper relation.

I have illustrated and described an embodiment of my invention which I have found very practical. I have not attempted to illustrate or describe modifications or other adaptations which I contemplate as I believe this disclosure will enable those skilled in the art to embody and adapt my improvements as may be desired.

Having thus described my invention, what I claim as new and desire to secure by Letters Patent, is:

1. In an apparatus of the class described, the combination of a supporting bar adapted to be introduced into a conduit section and having an overhanging suspending arm, said suspending arm being provided with rollers on its inner side, a suspending chain attached to the end of said arm, an adjustable link extending from said suspending chain to the base of said arm, a shaft disposed longitudinally of said bar and provided with pinions, a segmental saddle provided with racks resting on said pinions, said saddle having depending brackets slotted to receive said shaft, an adjusting worm, and a coacting worm gear on said shaft whereby the shaft may be rotatably adjusted and is held against rotation.

2. In an apparatus of the class described, the combination of a supporting bar adapted to be introduced into a conduit section and having an overhanging suspending arm, said suspending arm being provided with rollers on its inner side, a shaft disposed longitudinally of said bar and provided with pinions, a segmental saddle provided with racks resting on said pinions, said saddle having depending brackets slotted to receive said shaft, an adjusting worm, and a coacting worm gear on said shaft whereby the shaft may be rotatably adjusted and is held against rotation.

3. In an apparatus of the class described, the combination of a supporting bar adapted to be introduced into a conduit section, a shaft disposed longitudinally of said bar and provided with pinions, a segmental saddle provided with racks resting on said pinions, said saddle having depending brackets slotted to receive said shaft, an adjusting worm, and a coacting worm gear on said shaft whereby the shaft may be rotatably adjusted and is held against rotation.

4. In an apparatus of the class described, the combination of a supporting bar adapted to be introduced into a conduit section and having an overhanging suspending arm, said suspending arm being provided with rollers on its inner side, a suspending chain attached to the end of said arm, an adjustable link extending from said suspending chain to the base of said arm, a saddle mounted on said arm for lateral adjustment, and means for adjusting said saddle.

5. In an apparatus of the class described, the combination of a supporting bar adapted to be introduced into a conduit section and having an overhanging suspending arm, a suspending chain attached to the end of said arm, an adjustable link extending from said suspending chain to the base of said arm, a saddle mounted on said arm for lateral adjustment, and means for adjusting said saddle.

6. In an apparatus of the class described, the combination of a supporting bar adapted to be introduced into a conduit section, a shaft disposed longitudinally of said bar and provided with pinions, a saddle provided with racks resting on said pinions, and means for actuating said shaft.

7. In an apparatus of the class described, the combination of a supporting bar provided with an overhanging suspending arm, the arm being provided with rollers on its inner side, a shaft mounted on said bar and provided with pinions, a saddle adjustably supported by said pinions, and means for rotating said shaft and locking it in its adjusted positions.

8. In an apparatus of the class described, the combination of a supporting bar, a shaft mounted on said bar and provided with pinions, a saddle adjustably supported by said pinions, and means for rotating said shaft and locking it in its adjusted positions.

9. In an apparatus of the class described, the combination of a supporting bar, a shaft mounted thereon and provided with pinions, a saddle provided with racks resting on said pinions, and a worm means for adjusting said shaft disposed at the outer end of said bar.

10. In an apparatus of the class described, the combination of a supporting bar, a shaft mounted thereon and provided with pinions, a saddle provided with racks resting on said pinions, and means for adjusting said shaft.

11. In an apparatus of the class described, the combination of a supporting bar adapted to be introduced into a conduit section, a suspending means for said bar, a saddle adjustably mounted on said bar, and means for adjusting said saddle and supporting it in its adjusted positions.

In witness whereof I have hereunto set my hand.

DAVID D. TRACY.